United States Patent [19]

Hasenbein et al.

[11] Patent Number: 5,100,978
[45] Date of Patent: Mar. 31, 1992

[54] PREPARATION OF POLYETHYLENE AND COPOLYMERS OF PREDOMINANT AMOUNTS OF ETHYLENE

[75] Inventors: Norbert Hasenbein, Dirmstein; Wolfgang Ball, Mannheim; Juergen Schmidt-Theummes, Neuhofen; Gernot Koehler, Worms, all of Fed. Rep. of Germany

[73] Assignee: BASF Aktiengesellschaft, Ludwigshafen, Fed. Rep. of Germany

[21] Appl. No.: 508,183

[22] Filed: Apr. 12, 1990

[30] Foreign Application Priority Data

Apr. 20, 1989 [DE] Fed. Rep. of Germany ....... 3912957

[51] Int. Cl.$^5$ .......................... C08F 4/28; C08F 10/02
[52] U.S. Cl. ........................................ 526/86; 526/64; 526/65; 526/88; 526/208; 526/228
[58] Field of Search .................... 526/64, 65, 86, 88, 526/937, 352, 318.6, 913, 272, 329, 228, 208

[56] References Cited

U.S. PATENT DOCUMENTS

| | | |
|---|---|---|
| 3,628,918 | 12/1971 | Beals et al. ............................ 23/284 |
| 3,660,370 | 5/1972 | Gropper . |
| 3,714,135 | 1/1973 | Pfannmueller et al. ......... 526/329 X |
| 3,875,134 | 4/1975 | Morikawa et al. . |
| 4,000,357 | 12/1976 | Marano, Jr. . |
| 4,076,919 | 2/1978 | Urban et al. . |
| 4,135,044 | 1/1979 | Beals . |

FOREIGN PATENT DOCUMENTS

| | | |
|---|---|---|
| 2322553 | 5/1973 | Fed. Rep. of Germany . |
| 2558266 | 12/1975 | Fed. Rep. of Germany . |
| 2748263 | 10/1977 | Fed. Rep. of Germany . |
| 3308926 | 3/1983 | Fed. Rep. of Germany . |
| 710392 | 8/1968 | France . |
| 2335531 | 12/1976 | France . |
| 1010847 | 11/1965 | United Kingdom . |
| 1047851 | 11/1966 | United Kingdom ................... 526/64 |
| 1196138 | 6/1970 | United Kingdom . |
| 1562100 | 3/1980 | United Kingdom . |

Primary Examiner—Fred Teskin
Attorney, Agent, or Firm—Keil & Weinkauf

[57] ABSTRACT

Polyethylene and copolymers of predominant amounts of ethylene and minor amounts of comonomers which are polymerizable with ethylene are obtainable by free radical polymerization of the monomers under from 1,500 to 5,000 bar and at from 40° to 250° C. by means of an initiator with virtually complete exclusion of oxygen in not less than n=3 polymerization stages, by a method in which, in the first stage, the total amount of the predominant part of the monomers are subjected to polymerization using some of the initiator required, until said polymerization comes virtually to a stop, thereafter a further part of the initiator and, if required, of the monomers are added to the mixture, which has been cooled by 20°-60° C., and this process is repeated in the subsequent stages until the n th stage, with the proviso that the initiators used in the (n−1) th stage have a half-life temperature of from 80° to 160° C.

3 Claims, No Drawings

PREPARATION OF POLYETHYLENE AND COPOLYMERS OF PREDOMINANT AMOUNTS OF ETHYLENE

The present invention relates to polyethyle and copolymers of predominant amounts of ethylene and minor amounts of comonomers which are polymerizable with ethylene, obtainable by free radical polymerization of the monomers under from 1,500 to 5,000 bar and at from 40° to 250° C. using an initiator, with virtually complete exclusion of oxygen, in at least n=3 polymerization stages, wherein, in the first stage, the total amount or the predominant part of the monomers is subjected to polymerization using some of the initiator required, until the polymerization comes virtually to a stop, a further part of the initiator and, if required, of the monomers are added to the mixture which has been cooled by 20°-60° C., and this process is repeated in the subsequent stages until the n th stage, with the proviso that the initiators used in the (n−1) th stage have a half-life temperature of from 80° to 160° C.

Processes for the preparation of ethylene homo and copolymers under superatmospheric pressure and at more than 40° C. have already been described in certain patents. The reaction is carried out either in tube reactors (DE-B 2 557 653, DE-A 2 558 266, DE-A 3 308 926, FR-B 2 335 531, GB-B 1 010 847) or in a combination of a reactor with back-mixing and a downstream tube reactor (DE-A 2 322 553 and DE-B 710 392). The densities of the resulting ethylene polymers are below 925 kg/m$^3$. However, for many applications it is necessary to use polyethylene having densities of more than 925 kg/m$^3$ since only these have the appropriately good optical properties. Their preparation by free radical polymerization under superatmospheric pressure and at elevated temperature is possible but entails considerable difficulties since the free radical polymerization method permits high crystallinities and densities only at relatively low polymerization temperatures (Batzer, Polymere Werkstoffe, Volume II - Technologie 2, Georg Thieme Verlag Stuttgart 1984, page 31), with the result that the conversion is substantially reduced. Consequently, only conversions of less than 25% are usually achieved in the preparation of such polyethylenes (U.S. A No.3 660 370).

DE-A 2 748 263 describes a process for the preparation of polyethylenes having the desired density at conversions of more than 25%. In this process, an extremely complex type of reactor is required, in which it is necessary to change the reactor cross-section substantially several times, to convey the reaction mass through the reaction tube at a cross-sectional flow rate of not less than 0.307 m$^2$/s and to design the reactor so that each reaction zone is followed by a cooling and working-up zone. By means of these equipment and process design measures, polyethylenes having the desired density can be prepared by this process only at very great expense.

It is an object of the present invention to overcome the disadvantages described and to prepare ethylene homo- and copolymers having densities of more than 925 kg/m$^3$ and good optical properties at acceptable costs in terms of equipment and processing.

We have found that this object is achieved by the polymers defined at the outset.

The process used for the preparation of the novel polymers can be employed both for the homopolymers and for the copolymers of ethylene with other monomers, provided that they undergo free radical copolymerization with ethylene under high pressure. These include $\alpha,\beta$ ethylenically unsaturated C$_3$-C$_8$-carboxylic acids, in particular maleic acid, fumaric acid, itaconic acid, acrylic acid, methacrylic acid and crotonic acid. Other suitable comonomers are $\alpha,\beta$-ethylenically unsaturated C$_4$-C$_{15}$-carboxylic esters or anhydrides, methyl methacrylate, ethyl acrylate, n-butyl acrylate, methacrylic anhydride, maleic anhydride and itaconic anhydride being preferably used. The comonomer content of the novel copolymer should not exceed 40%, preferably 20%.

The polymerization reaction is carried out under from 500 to 5,000 bar and at from 40° to 250° C., preferably under from 1,500 to 3,500 bar and at from 100° to 250° C.

The polymerization by the novel process is initiated by the addition of free radical initiators which have a half-life temperature of from 80° to 160° C. The half-life temperature is understood as the temperature at which half of the initiator dissolved in benzene decomposes in the course of one minute. Examples of such initiators are di-2-ethylhexyl peroxydicarbonate, dicyclohexyl peroxydicarbonate, dicetyl peroxydicarbonate, cumyl perneodecanoate, tert-amyl perpivalate, tert-butyl perneodecanoate, tert-butyl permaleate and preferably tert-butyl perpivalate and tert-butyl perisononanoate. If necessary, the n th polymerization stage can also be initiated by an initiator having a half-life temperature up to 250° C., for example by tert-butyl perbenzoate or by methyl isobutyl ketone peroxide. The initiators can be used individually or as a mixture in concentrations of from 0.5 to 100, preferably from 0.5 to 50, ppm/h, based on the amount of monomers. It has proven advantageous to use the initiators in the dissolved state. Examples of suitable solvents are aliphatic hydrocarbons, in particular octane or isododecane.

The molecular weight of the claimed polymers can be controlled in the conventional manner by adding regulators. Suitable regulators include aliphatic hydrocarbons, ketones and aldehydes, propionaldehyde being preferably used.

The polymers are prepared, according to the invention, with the virtual exclusion of oxygen.

The process is carried out in three or more successive stages, and the polymerization has to be reinitiated in each stage by adding the appropriate initiators. Reactors which are suitable for this purpose include tube reactors which are provided with a number of inlet points for the initiator and if necessary for feeding in further amounts of monomers. The tube reactor should have a length/diameter ratio of not less than 1,000, preferably more than 2,000, and a length of from 50 to 1,000 m and should be arranged in the coiled form. The heat of reaction evolved during the polymerization of the ethylene is removed by cooling the reactor wall with water from the outside. If necessary, a reactor with back-mixing, in particular a stirred autoclave, may be arranged upstream of the tube reactor. In this case, it is also possible to cool the mixture emerging from the stirred reactor with the aid of a heat exchanger before the said mixture enters the tube reactor. As a rule, however, the process is carried out without a heat exchanger. The reactors used in the process furthermore contain a number of temperature measuring apparatuses inside the reactor, so that the temperature variation during the polymerization can be observed.

In a preferred embodiment, the reaction mixture of ethylene and a regulator is first compressed to more than 1,500 bar, heated to above 100° C. and then fed, together with some of the initiator, into a tube reactor, where the polymerization is rapidly initiated after decomposition of the initiator. The reactor cooling should be adjusted so that the temperature inside the tube does not exceed 250° C. After only a short time, a temperature profile dependent on the conversion of the polymerization is established along the tube reactor. Ceasing of the reaction is indicated by a fall in the temperature inside the tube. When a temperature of 20°-60° C. below the maximum is reached, the polymerization is reinitiated by adding further amounts of initiator. As a result of this, the temperature initially increases substantially again and it is necessary to employ suitable cooling measures to ensure that the maximum temperature reached is not more than 250° C. By feeding in further initiators, this process can be repeated along the reaction tube as often as desired. This results in a number of different polymerization stages in the reactor, which stages are all characterized by a certain maximum temperature. According to the invention, the process should have three or more stages. Either cold or, preferably, preheated ethylene may be added to the reaction mixture at the same place or in a different place, in addition to the initiator. The mean residence times of the mixture in the tube reactor are from 30 to 300, preferably from 30 to 120, seconds After the reaction mixture has been discharged, the polymer is separated from unconsumed ethylene by letting down the mixture and unconsumed ethylene is advantageously recycled to the reactor.

The process described can be carried out in a similar manner also in a reactor with back-mixing and a downstream tube reactor. In this case, the temperature increase in the reactor with back-mixing should be limited to 230° C. After the polymerization has died down, the reaction mixture together with still unconsumed monomer is passed through a high pressure tube, which may still be connected to a heat exchanger, and into the tube reactor, where the process is continued as described above. The mean residence time of the mixture in the reactor with back-mixing is from 10 to 100, preferably from 10 to 30, seconds, and that in the tube reactor is from 10 to 200, preferably from 10 to 100, seconds.

The novel polymers possess the desired densities of more than 925, generally even more than 930, kg/m$^3$. Their melt flow indices are from 0.1 to 100, preferably from 0.2 to 10, g/10 min, measured in each case according to DIN 53,735. The melt flow index corresponds to the amount of polymer which is forced out of the test apparatus, standardized according to DIN 53,735, in the course of 10 minutes at 190° C. and under a weight of 2.16 kg. Films which are produced from these polymers have good splicing properties and excellent optical properties. This is evident in particular from the relatively small amounts of scattered light (according to DIN 53,490) and the increased gloss (according to DIN 67,530). The novel process permits the preparation of polymers having densities of more than 925 kg/m$^3$ at conversions of more than 25%. Another advantage is that the reactors conventionally employed in high pressure technology can be used, ie. it is not necessary to rely on, for example, reactors having changing cross-sections, and the process can be carried out without particularly complicated technology. In contrast to the process of DE-A 2 748 263, the desired polymers are also obtained when the reaction mixture flows through the reactor at cross-sectional flow rates which are substantially lower than 0 307 m$^2$/s.

Because of their good optical properties, the novel polymers are particularly suitable for the production of films, as coating materials and as photoresists.

EXAMPLES

Examples 1 to 3 and the corresponding Comparative Examples A and B were carried out in a tubular reactor having a length of 420 meters and a length/diameter ratio of 25,000. The polymers obtained in Examples 1 to 3 had good optical properties, especially low light scattering and high glass (Table 1). Their densities were greater than 930 kg/m$^3$.

The amounts of initiator added in each of the experiments are stated in ppm/h and relate in each case to the ethylene used.

EXAMPLE 1

2.3 t/h of ethylene together with 2 l/h of propionaldehyde as a regulator were compressed to 2,800 bar in a high pressure compressor, heated to 145° C. and fed into the tube reactor. The polymerization was initiated by adding 4.8 ppm/h of tert-butyl perpivalate and 3.8 ppm/h of tert-butyl perisononanoate, which were added to the monomers at the inlet point of the tube reactor. After the reaction had died down, the polymerization was reinitiated by adding 2 portions of 3.4 ppm/h of tert-butyl perpivalate and then adding 2.2 ppm/h of tert-butyl perisononanoate, so that a total of 4 temperature maxima were formed, none of which exceeded 240° C. The mean residence time of the reaction mixture was 80 seconds and the cross-sectional flow rate was 0.11 m$^2$/s. The ethylene conversion was 25.5%.

EXAMPLE 2

2.3 t/h of ethylene were fed into the tube reactor under the same conditions described in Example 1 and were polymerized. After the reaction had died down, the polymerization was first reinitiated by means of 14.2 ppm/h of tert-butyl perpivalate and then by means of 7.6 ppm/h of tert-butyl perisononanoate, with the result that a total of 3 temperature maxima were obtained, all of which were below 250° C. The mean residence time was 80 seconds and the mean cross-sectional flow rate was 0.11 m$^2$/s. In the reaction, 26.5% of the ethylene originally used was converted.

EXAMPLE 3

1.15 t/h of ethylene together with 2 l/h of propionaldehyde as a regulator were compressed to 2,800 bar in a high pressure compressor, heated to 145° C. and fed into the tube reactor. The polymerization was initiated by means of 1.3 ppm/h of tert-butyl perpivalate and 2.5 ppm/h of tert-butyl perisononanoate at the inlet point of the reactor. After the reaction had died down, the polymerization was reinitiated by adding 2.3 ppm/h of tert-butyl perisononanoate and 1.6 ppm/h of tert-butyl perpivalate at a further point in the reactor. The mixture heated by the heat of polymerization was cooled by feeding in 1.15 t/h of ethylene which had been compressed beforehand to 2,800 bar and heated to 70° C. Thereafter, a further 3.8 ppm/h of tert-butyl perpivalate and 3.0 ppm/h of tert-butyl perisononanoate were added at two further points in the reactor, so that a total of 4 temperature maxima were formed, 235° C. not being exceeded. The mean residence time of the mixture was 70 seconds, the cross-sectional flow rate was 0.22 m$^2$/s and the ethylene conversion was 26.0%.

COMPARATIVE EXAMPLE A

Polymerization was carried out under the same conditions as in Example 2, the only difference being that the polymerization was reinitiated only once by adding 7.0 ppm/h of tert-butyl perisononanoate. The ethylene conversion in this case was only 21.9%.

COMPARATIVE EXAMPLE B

Polymerization was carried out as stated in Example 1, the only difference being that, instead of tert-butyl perisononanoate, methyl isobutyl ketone hydroperoxide, which had a half-life temperature of 190° C, was used. The products obainable had densities of less than 925 kg/m$^3$.

COMPARATIVE EXAMPLES A AND B

The polymers obtainable in these experiments had considerably poorer optical properties compared with Examples 1 to 3 (Table 1). Their splicing properties were inadequate.

EXAMPLE 5

First 1.4 t/h of ethylene were polymerized in the stirred autoclave similarly to Example 4, by the addition of 14.4 ppm/h of tert-butyl perpivalate, the maximum temperature being 220° C.

The reaction mixture was then fed via an insulated high pressure tube into the tube reactor, and 1.65 ppm/h of tert-butyl perisononanoate were added at the inlet point. After the polymerization had died down, it was reinitiated by means of 1.15 ppm/h of tert-butyl perisononanoate. As a result, a total of 2 temperature maxima were formed in the tube reactor, the first being 242° C. and the second 235° C. The mean residence times of the mixture were 20 seconds for the stirred autoclave and 40 seconds for the tube reactor. 26 9% of the ethylene originally used was converted.

EXAMPLE 6

0 7 t/h of ethylene together with 1.4 l/h of propionaldehyde as a regulator were compressed to 2,800 bar with the aid of a high pressure compressor, heated to 30° C. and introduced into the stirred autoclave. The polymerization was initiated by means of 10 ppm/h of

TABLE 1

|  | Conversion [%] | Density [kg/m$^3$] | Melt flow index* [g/10 min] | Scattered light** [%] | Gloss*** [%] | Splicing properties |
|---|---|---|---|---|---|---|
| Example 1 | 25.5 | 932.6 | 3.5 | 14 | 49 | Good |
| Example 2 | 26.5 | 930.1 | 3.1 | 15 | 48 | Good |
| Example 3 | 26.0 | 932.3 | 3.5 | — | — | Good |
| Comp. Example A | 21.9 | 929.9 | 3.1 | 18 | 40 | Poor |
| Comp. Example B | 25.7 | 923.5 | 3.0 | 22 | 33 | Poor |

*According to DIN 53,735, at 190° C. and 2.16 kg
**According to DIN 53,490
***According to DIN 67,530, at an angle of 20°

Examples 4 to 6 were carried out in the same way as Comparative Examples C to E in a polymerization system which consisted of a stirred autoclave having a volume of 35 l and a connected tube reactor having a length of 200 meters and a length/diameter ratio of 13,300. The polymers obtainable in Examples 4 to 6 had good optical properties, especially low light scattering and high gloss (Table 2). Their densities were greater than 930 kg/m$^3$.

The amounts of initiators added in the experiments are stated in ppm/h and relate in each case to the ethylene used.

EXAMPLE 4

1.4 t/h of ethylene together with 1.4 l/h of propionaldehyde as a regulator were compressed to 2,800 bar in a high pressure compressor and fed into the stirred autoclave at a gas inlet temperature of 30° C. The polymerization was initiated by means of 10.4 ppm/h of tert-butyl perpivalate and the content of the autoclave was mixed with the aid of a stirrer at a speed of 1,300 rpm. The mean residence time was 25 seconds. The maximum temperature in the autoclave was 211° C.

The reaction mixture was then fed via an insulated high pressure tube into the tube reactor, and the polymerization was reinitiated by means of 1.5 ppm/h of tert-butyl perisononanoate. This process was repeated at a further point in the tube reactor, using 0.95 ppm/h of the same initiator, so that a total of 2 temperature maxima formed there, both of which were below 230° C. The mean residence time was 40 seconds and the ethylene conversion was 25.5%.

tert-butyl perpivalate, and the reactor content was mixed with the aid of a stirrer at a speed of 1,300 rpm. The mean residence time in the reactor was 50 seconds. The temperature in the reactor was 210° C.

Before entering the tube reactor, the content of the autoclave was mixed with 0.7 t/h of ethylene, which had been compressed beforehand to 2,800 bar and heated to 60° C., and was then introduced into the tube reactor. At the inlet point of the said reactor, the polymerization was reinitiated by means of 0.9 ppm/h of tert-butyl perpivalate and 1.8 ppm/h of tert-butyl perisononanoate. After the reaction had died down, 0.95 and 1.1 ppm/h of tert-butyl perisononanoate were added at two further points in the tube reactor, so that a total of 3 temperature maxima were formed, all of which were below 235° C. The mean residence time was 45 seconds and the ethylene conversion was 27.2%.

COMPARATIVE EXAMPLE C

The experiment was carried out under the same conditions as in Example 4, the only difference being that the polymerization in the tube reactor was reinitiated only once by adding 1.5 ppm/h of tert-butyl perisononanoate. The ethylene conversion achieved was only 22.5%.

COMPARATIVE EXAMPLE D

The procedure was carried out under the same conditions as in Example 6, the only difference being that the ethylene which had been added to the mixture discharged from the sirred autoclave contained 4 ppm of air and thereafter no further initiation was effected. The resulting polymer had a density of only 922.5 kg/m³. The ethylene conversion was 25.5%.

COMPARATIVE EXAMPLE E

The polymerization was carried out under the same conditions as stated in Example 5. The only difference in the experimental procedure was that, instead of tert-butyl perisononanoate, methyl isobutyl ketone hydroperoxide was used. In both polymerization zones, the temperature maxima were below 270° C. The resulting polymers had densities of less than 921.5 kg/m³. The ethylene conversion was 27.8%.

COMPARATIVE EXAMPLES C TO E

The polymers obtainable in these experiments had considerably poorer properties (see Table 2) compared to the polymers known from Examples 4 to 6.

TABLE 2

|  | Conversion [%] | Density [kg/m³] | Melt flow index* [g/10 min] | Scattered light** [%] | Gloss*** [%] | Splicing properties |
|---|---|---|---|---|---|---|
| Example 4 | 25.5 | 933.5 | 2.6 | 13 | 60 | Good |
| Example 5 | 26.9 | 930.6 | 2.8 | 15 | 57 | Good |
| Example 6 | 27.2 | 931.2 | 3.1 | 15 | 55 | Good |
| Comp. Example C | 22.5 | 933.8 | 2.5 | 17 | 51 | Poor |
| Comp. Example D | 25.5 | 922.5 | 3.5 | 25 | 48 | Poor |
| Comp. Example E | 27.8 | 921.5 | 2.8 | 21 | 43 | Poor |

*According to DIN 53,735, at 190° C. and 2.16 kg
**According to DIN 53,490
***According to DIN 67,530, at an angle of 20°

We claim:

1. A process for the preparation of a polymer or copolymer by free radical polymerization of ethylene in the presence or absence of minor amounts of comonomers which are polymerizable with ethylene, under from 1,500 to 5,000 bar, wherein an initiator is used at from 40° to 250° C. and the reaction is carried out with virtually complete exclusion of oxygen in not less than n=3 polymerization stages, in the first stage a mixture of a regulator and the total amount or the predominant part of the monomers being subjected to polymerization using some of the initiator required, until said polymerization comes virtually to a stop, thereafter a further part of the initiator and, if required, of the monomers being added to the mixture, which has been cooled by 20°-60° C. from the maximum temperature reached during polymerization, this process being repeated until the n th stage, with the proviso that the initiators used in all stages except the n th stage have a half-life temperature of from 80° to 160° C.

2. The process as described in claim 1, wherein the polymerization is carried out continuously in a tube reactor which is provided with n feed points for the initiator.

3. The process as defined in claim 1, wherein the polymerization in the first polymerization stage is carried out in a reactor with back-mixing, at from 40° to 230° C., and all further stages are carried out in a tube reactor.

* * * * *

UNITED STATES PATENT AND TRADEMARK OFFICE
CERTIFICATE OF CORRECTION

PATENT NO. : 5,100,978
DATED : Mar. 31, 1992
INVENTOR(S) : Hasenbein et al.

It is certified that error appears in the above-identified patent and that said Letters Patent is hereby corrected as shown below:

On the title page

The last name of the third joint inventor "Schmidt-Theummes"

should read --Schmidt-Thuemmes--.

Under the heading "Foreign Application Priority Data", the application number of the German document with priority date Apr. 20, 1989 should read --3912975--.

In the Abstract

Line 8, delete "of" and substitute therefore --or--.

Signed and Sealed this

Fifteenth Day of June, 1993

Attest:

MICHAEL K. KIRK

Attesting Officer     Acting Commissioner of Patents and Trademarks